(12) United States Patent
Takeuchi et al.

(10) Patent No.: US 9,310,799 B2
(45) Date of Patent: Apr. 12, 2016

(54) NUMERICAL CONTROLLER HAVING FUNCTION OF OPERATION BASED ON TABLE FORMAT DATA

(75) Inventors: Yasushi Takeuchi, Minamitsuru-gun (JP); Takahiro Haraguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 762 days.

(21) Appl. No.: 13/406,787

(22) Filed: Feb. 28, 2012

(65) Prior Publication Data

US 2012/0283879 A1    Nov. 8, 2012

(30) Foreign Application Priority Data

May 6, 2011 (JP) ................................ 2011-103770

(51) Int. Cl.
  *G05B 13/00* (2006.01)
  *G05B 19/4155* (2006.01)

(52) U.S. Cl.
  CPC .. *G05B 19/4155* (2013.01); *G05B 2219/35172* (2013.01)

(58) Field of Classification Search
  CPC ............. G05B 19/4155; G05B 19/423; G05B 2219/35172
  USPC ......... 700/114, 128, 173, 180, 188, 192, 186, 700/275, 245, 246; 710/100; 318/600
  See application file for complete search history.

(56) References Cited

U.S. PATENT DOCUMENTS

| | | | |
|---|---|---|---|
| 4,692,856 A | | 9/1987 | Komiya |
| 6,885,909 B2 | * | 4/2005 | Isohata ........................ 700/193 |
| 7,003,373 B2 | * | 2/2006 | Baumann et al. ............. 700/189 |
| 7,552,002 B2 | * | 6/2009 | Endo et al. ....................... 701/50 |
| 2003/0191553 A1 | * | 10/2003 | Isohata .......................... 700/170 |
| 2004/0002794 A1 | * | 1/2004 | Pillar ..................... A62C 27/00 701/1 |
| 2005/0024003 A1 | * | 2/2005 | Kochiya et al. ............... 318/569 |
| 2005/0045821 A1 | * | 3/2005 | Noji ..................... G01N 23/225 250/311 |

(Continued)

FOREIGN PATENT DOCUMENTS

| | | |
|---|---|---|
| CN | 1854950 A | 11/2006 |
| CN | 1854951 A | 11/2006 |

(Continued)

OTHER PUBLICATIONS

Boge, Alfred: Handbuch Maschinenbau• Grundlagen and Anwendungen der Maschinenbau•Technik, 2009, 19th Edition, pp. 28-31.

(Continued)

*Primary Examiner* — Mohammad Ali
*Assistant Examiner* — Ziaul Karim
(74) *Attorney, Agent, or Firm* — Drinker Biddle & Reath LLP

(57) ABSTRACT

A numerical controller using table format data, the numerical controller including a memory which stores table format data, in which time or a position of a spindle or feed shaft serving as a reference is arranged so as to correspond to a position of a spindle or feed shaft other than the spindle or feed shaft of which position serves as a reference or an output of an auxiliary function, a reference value counter which inputs the time or the position of the spindle or feed shaft serving as a reference, wherein the position of the spindle or feed shaft other than the spindle or feed shaft of which position serves as a reference or the output of the auxiliary function is controlled.

9 Claims, 17 Drawing Sheets

(56) References Cited

U.S. PATENT DOCUMENTS

| | | | |
|---|---|---|---|
| 2006/0235565 A1* | 10/2006 | Endo et al. | 700/187 |
| 2006/0239386 A1 | 10/2006 | Endo et al. | |
| 2006/0241839 A1* | 10/2006 | Endo et al. | 701/50 |
| 2008/0234857 A1* | 9/2008 | Endo | G05B 19/408 700/186 |

FOREIGN PATENT DOCUMENTS

| | | | |
|---|---|---|---|
| DE | 10343809 | A1 | 4/2004 |
| DE | 60302920 | T2 | 7/2006 |
| EP | 1720083 | A2 | 11/2006 |
| JP | 59-177604 | | 10/1984 |
| JP | 2003-303005 | | 10/2003 |
| JP | 2006-289583 | A | 10/2006 |
| JP | 2006-302208 | | 11/2006 |

OTHER PUBLICATIONS

Office Action issued in German Patent Application No. 10 2012 008 541.9, dated Jul. 28, 2014, with English Translation.

\* cited by examiner

FIG. 3A

PATH TABLE OF X AXIS (PATH TABLE NUMBER 3000)  Tx

| COMMAND OF TIME SERVING AS REFERENCE | COMMAND OF X-AXIS POSITION | WAITING COMMAND |
|---|---|---|
| L0. 0 | X0. 0 | |
| L1. 0 | X1. 0 | |
| L2. 0 | X3. 0 | |
| L3. 0 | X5. 0 | |
| L4. 0 | X6. 0 | |
| L5. 0 | X7. 0 | WAIT(X, S, M) |
| L6. 0 | X9. 0 | |

FIG. 3B

PATH TABLE OF SPINDLE S (PATH TABLE NUMBER 3000)  Ts

| COMMAND OF TIME SERVING AS REFERENCE | COMMAND OF SPINDLE POSITION | WAITING COMMAND |
|---|---|---|
| L0. 0 | S0. 0 | |
| L1. 0 | S2. 0 | |
| L2. 0 | S6. 0 | |
| L3. 0 | S10. 0 | |
| L4. 0 | S12. 0 | |
| L5. 0 | S14. 0 | WAIT(X, S, M) |
| L6. 0 | S18. 0 | |

FIG. 3C

PATH TABLE OF AUXILIARY FUNCTION (PATH TABLE NUMBER 3000)  Tm

| COMMAND OF TIME SERVING AS REFERENCE | COMMAND OF AUXILIARY FUNCTION | WAITING COMMAND |
|---|---|---|
| L2. 0 | M1234 | |
| L3. 0 | M2345 | WAIT(X, S, M) |

FIG. 4

PATH TABLE NUMBER: 3000

| PATH TABLE Tx OF X AXIS | | PATH TABLE Ts OF SPINDLE S | | PATH TABLE Tm OF AUXILIARY FUNCTION | |
|---|---|---|---|---|---|
| TIME (ms) SERVING AS REFERENCE | PROGRAM PATH OF X AXIS (mm) | TIME (ms) SERVING AS REFERENCE | PROGRAM PATH OF SPINDLE S (deg) | TIME (ms) SERVING AS REFERENCE | AUXILIARY FUNCTION TO BE OUTPUT |
| 0.0 | 0.0 | 0.0 | 0.0 | 0.0 | |
| 1.0 | 1.0 | 1.0 | 2.0 | 1.0 | |
| 2.0 | 3.0 | 2.0 | 6.0 | 2.0 | M1234 |
| 3.0 | 5.0 | 3.0 | 10.0 | 2.0 | |
| 4.0 | 6.0 | 4.0 | 12.0 | 2.0 | |
| 5.0 | WAIT(X, S, M) | 5.0 | WAIT(X, S, M) | 3.0 | WAIT(X, S, M) |
| 5.0 | WAIT(X, S, M) | 5.0 | WAIT(X, S, M) | 3.0 | M2345 |
| 5.0 | 7.0 | 5.0 | 14.0 | 4.0 | |
| 6.0 | 9.0 | 6.0 | 18.0 | | |

FIG. 5A

PATH TABLE OF X AXIS OF PATH 1 (PATH TABLE NUMBER 4000)   T1x

| COMMAND OF TIME SERVING AS REFERENCE | COMMAND OF X-AXIS POSITION | WAITING COMMAND |
|---|---|---|
| L0.0 | X0.0 | |
| L1.0 | X1.0 | |
| L2.0 | X3.0 | |
| L3.0 | X5.0 | |
| L4.0 | X6.0 | |
| L5.0 | X7.0 | WAIT(P1X, P2S, P3M) |
| L6.0 | X9.0 | |

FIG. 5B

PATH TABLE OF SPINDLE S OF PATH 2 (PATH TABLE NUMBER 4000)   T2s

| COMMAND OF TIME SERVING AS REFERENCE | COMMAND OF SPINDLE POSITION | WAITING COMMAND |
|---|---|---|
| L0.0 | S0.0 | |
| L1.0 | S2.0 | |
| L2.0 | S6.0 | |
| L3.0 | S10.0 | |
| L4.0 | S12.0 | |
| L5.0 | S14.0 | WAIT(P1X, P2S, P3M) |
| L6.0 | S18.0 | |

FIG. 5C

PATH TABLE OF AUXILIARY FUNCTION OF PATH 3 (PATH TABLE NUMBER 4000)   T3m

| COMMAND OF TIME SERVING AS REFERENCE | COMMAND OF AUXILIARY FUNCTION | WAITING COMMAND |
|---|---|---|
| L2.0 | M1234 | |
| L3.0 | M2345 | WAIT(P1X, P2S, P3M) |

FIG. 6

PATH TABLE NUMBER 4000

| PATH TABLE T1x OF X AXIS OF PATH 1 | | PATH TABLE T2s OF SPINDLE S OF PATH 2 | | PATH TABLE T3m OF AUXILIARY FUNCTION OF PATH 3 | |
|---|---|---|---|---|---|
| TIME(ms) SERVING AS REFERENCE | PROGRAM PATH OF X AXIS (mm) | TIME(ms) SERVING AS REFERENCE | PROGRAM PATH OF SPINDLE S (deg) | TIME(ms) SERVING AS REFERENCE | AUXILIARY FUNCTION TO BE OUTPUT |
| 0.0 | 0.0 | 0.0 | 0.0 | 0.0 | |
| 1.0 | 1.0 | 1.0 | 2.0 | 1.0 | |
| 2.0 | 3.0 | 2.0 | 6.0 | 2.0 | M1234 |
| 3.0 | 5.0 | 3.0 | 10.0 | 2.0 | |
| 4.0 | 6.0 | 4.0 | 12.0 | 2.0 | |
| 5.0 | WAIT(P1X, P2S, P3M) | 5.0 | WAIT(P1X, P2S, P3M) | 2.0 | |
| 5.0 | WAIT(P1X, P2S, P3M) | 5.0 | WAIT(P1X, P2S, P3M) | 3.0 | WAIT(P1X, P2S, P3M) |
| 5.0 | 7.0 | 5.0 | 14.0 | 3.0 | M2345 |
| 6.0 | 9.0 | 6.0 | 18.0 | 4.0 | |

FIG. 13A

PATH TABLE OF PATH 1    T1x

| COMMAND OF TIME, SPINDLE POSITION OR FEED SHAFT POSITION | COMMAND OF POSITION (POSITION OF SPINDLE OR FEED SHAFT OTHER THAN THE SPINDLE OR FEED SHAFT SERVING AS REFERENCE) | PATH WAITING COMMAND |
| --- | --- | --- |
| L0 | X0 | |
| L1 | X1 | P12 (PATHS 1 AND 2, WAITING) |
| L2 | X2 | |

FIG. 13B

PATH TABLE OF PATH 2    T2z

| COMMAND OF TIME, SPINDLE POSITION OR FEED SHAFT POSITION | COMMAND OF POSITION (POSITION OF SPINDLE OR FEED SHAFT OTHER THAN THE SPINDLE OR FEED SHAFT SERVING AS REFERENCE) | PATH WAITING COMMAND |
| --- | --- | --- |
| L0 | Z0 | |
| L1 | Z1 | |
| L2 | Z2 | |
| L3 | Z3 | P12 (PATHS 1 AND 2, WAITING) |

FIG. 14A

PATH TABLE OF X AXIS (PATH TABLE NUMBER 1000)

| COMMAND OF TIME SERVING AS REFERENCE | COMMAND OF X-AXIS POSITION |
|---|---|
| L0. 0 | X0. 0 |
| L1. 0 | X1. 0 |
| L2. 0 | X3. 0 |
| L3. 0 | X5. 0 |
| L4. 0 | X6. 0 |
| L5. 0 | X6. 0 |
| L6. 0 | X6. 0 |
| L7. 0 | X6. 0 |
| L8. 0 | X7. 0 |

FIG. 14B

PATH TABLE OF SPINDLE S (PATH TABLE NUMBER 1000)

| COMMAND OF TIME SERVING AS REFERENCE | COMMAND OF SPINDLE POSITION |
|---|---|
| L0. 0 | S0. 0 |
| L1. 0 | S2. 0 |
| L2. 0 | S6. 0 |
| L3. 0 | S10. 0 |
| L4. 0 | S12. 0 |
| L5. 0 | S12. 0 |
| L6. 0 | S12. 0 |
| L7. 0 | S12. 0 |
| L8. 0 | S14. 0 |

FIG. 14C

PATH TABLE OF AUXILIARY FUNCTION (PATH TABLE NUMBER 1000)

| COMMAND OF TIME SERVING AS REFERENCE | COMMAND OF AUXILIARY FUNCTION COMMAND |
|---|---|
| L2. 0 | M1234 |
| L8. 0 | M2345 |

FIG. 15

| PATH TABLE NUMBER | | | |
|---|---|---|---|
| 1000 | | | |
| TIME (ms) SERVING AS REFERENCE | PROGRAM PATH OF X AXIS (mm) | PROGRAM PATH OF SPINDLE S (deg) | AUXILIARY FUNCTION TO BE OUTPUT |
| 0.0 | 0.0 | 0.0 | |
| 1.0 | 1.0 | 2.0 | |
| 2.0 | 3.0 | 6.0 | M1234 |
| 3.0 | 5.0 | 10.0 | |
| 4.0 | 6.0 | 12.0 | |
| 5.0 | 6.0 | 12.0 | |
| 6.0 | 6.0 | 12.0 | |
| 7.0 | 6.0 | 12.0 | |
| 8.0 | 7.0 | 14.0 | M2345 |

FIG. 16A

PATH TABLE OF X AXIS (PATH TABLE NUMBER 2000)

| COMMAND OF TIME SERVING AS REFERENCE | X-AXIS POSITION COMMAND |
|---|---|
| L0. 0 | X0. 0 |
| L1. 0 | X1. 0 |
| L2. 0 | X3. 0 |
| L3. 0 | X5. 0 |
| L4. 0 | X6. 0 |
| L5. 0 | X7. 0 |

FIG. 16B

PATH TABLE OF SPINDLE S (PATH TABLE NUMBER 2000)

| COMMAND OF TIME SERVING AS REFERENCE | COMMAND OF SPINDLE POSITION |
|---|---|
| L0. 0 | S0. 0 |
| L1. 0 | S2. 0 |
| L2. 0 | S6. 0 |
| L3. 0 | S10. 0 |
| L4. 0 | S12. 0 |
| L5. 0 | S14. 0 |

FIG. 16C

PATH TABLE OF AUXILIARY FUNCTION (PATH TABLE NUMBER 2000)

| COMMAND OF TIME SERVING AS REFERENCE | COMMAND OF AUXILIARY FUNCTION |
|---|---|
| L2. 0 | M1234 |
| L5. 0 | M2345 |

FIG. 17

| PATH TABLE NUMBER | | | |
|---|---|---|---|
| 2000 | | | |
| TIME (ms) SERVING AS REFERENCE | PROGRAM PATH OF X AXIS (mm) | PROGRAM PATH OF SPINDLE S (deg) | AUXILIARY FUNCTION TO BE OUTPUT |
| 0.0 | 0.0 | 0.0 | |
| 1.0 | 1.0 | 2.0 | |
| 2.0 | 3.0 | 6.0 | M1234 |
| 2.0 | 3.0 | 6.0 | |
| 2.0 | 3.0 | 6.0 | |
| 2.0 | 3.0 | 6.0 | |
| 3.0 | 5.0 | 12.0 | |
| 4.0 | 6.0 | 12.0 | |
| 5.0 | 7.0 | 14.0 | M2345 |

NUMERICAL CONTROLLER HAVING FUNCTION OF OPERATION BASED ON TABLE FORMAT DATA

RELATED APPLICATION DATA

This application claims priority under 35 U.S.C. §119 and/or §365 to Japanese Application No. 2011-103770 filed May 6, 2011, the entire contents of which is incorporated herein by reference.

BACKGROUND OF THE INVENTION

1. Field of the Invention

The present invention relates to a numerical controller which controls a machine tool. Particularly, the present invention relates to a numerical controller having a function of driving and controlling each shaft of a machine tool based on data stored in a table format.

2. Description of the Related Art

There is a well-known numerical controller having a function (path table operation) of storing, in a memory, table format data (path table) in which a position of an axis is set on the basis of time, a spindle position or a feed shaft position serving as a reference, not on the basis of instructions in a block of an NC program, and driving each axis of a machine tool while reading out the table format data in sequence (see Japanese Patent Application Laid-Open Nos. 59-177604 and 2003-303005). This constitution allows free operation of tools regardless of instructions from a block of a machining program, and reduction in machining time and enhancement of accuracy of machining can be realized.

FIGS. 10, 11A and 11B are block diagrams of a path table operation disclosed in Japanese Patent Application Laid-Open No. 2003-303005 and views showing an example of a path table.

A numerical controller shown in FIG. 10, which performs the path table operation, includes a reference value counter 1, an X-axis path table Tx, a Z-axis path table Tz, an X-axis path table interpolation processing unit 4x, a Z-axis path table interpolation processing unit 4z, an X-axis motor 5x of a feed shaft, and a Z-axis motor 5z. A path table of FIG. 11B shows an example of the X-axis path table Tx, and the position of the X axis is stored with respect to time, a spindle position, or a feed shaft position. A graph of FIG. 11A is a graph showing the position of the X axis moved based on the path table Tx of FIG. 11B.

Japanese Patent Application Laid-Open No. 2006-302208 discloses an operation based on table format data wherein a unique reference value is provided for each of a plurality of paths so that the table format data belonging to each of the paths is operated with the use of the reference value corresponding to the path and a technique of waiting for the operation of the table format data of the plurality of paths.

FIG. 12 is a block diagram of path table operation disclosed in Japanese Patent Application Laid-Open No. 2006-302208. FIGS. 13A and 13B are views showing an example of a path table when the path table operation is waited in two paths.

A numerical controller shown in FIG. 12, which performs the path table operation, includes two paths including a path 1 and a path 2. The paths 1 and 2 respectively include X-axis path table T1x for path 1, Z-axis path table T2z for path 2, a reference value counter 1 (3-1), a reference value counter 2 (3-2), X-axis path table interpolation processing unit (4-1x) for path 1, a Z-axis path table interpolation processing unit (4-2z) for path 2, X-axis motor (5-1x) for path 1, and Z-axis motor (5-2z) for path 2. FIG. 13A shows an X-axis path table for path 1. FIG. 13B shows a Z-axis path table for path 2. In the X axis of path 1 and the Z axis of path 2, waiting is performed by a path waiting command P12 at a reference time or position.

In the operation based on the table format data (path table operation), a time of passing through each point in a program path is designated by the table format data, whereby all axes are operated in synchronism with a reference time. Similarly, a time of outputting a command to a spindle and an auxiliary function command is designated by the table format data, whereby all the spindle commands and the auxiliary function commands are output in synchronism with the reference time. In the conventional operation based on the table format data, since it is assumed that all axes in a path, a spindle, and an auxiliary function are operated in synchronism with one another, the reference time is shared in a path (see FIG. 10).

When an external apparatus such as an actuator using oil pressure and air pressure is controlled by the auxiliary function, a time from output of the auxiliary function to completion of the operation of the external apparatus may be indefinite. In the operation based on the table format data, when an auxiliary function in which an operating time is indefinite is executed, and, at the same time, the spindle or the feed shaft is driven, there are following two methods:

1) while the table format data of the auxiliary function in which a surplus time is added to a maximum operating time of the auxiliary function and the table format data of the spindle or the feed shaft are read out in sequence from a memory, the auxiliary function is executed, and the spindle and the feed shaft are driven (see FIGS. 14A to 14C and FIG. 15).

2) counting of reference is stopped from the start of the execution of the auxiliary function to the end thereof, and meanwhile, the spindle and the feed shaft are stopped (see FIGS. 16A to 16C and FIG. 17).

In the method of 1), the surplus time is added to the maximum operating time of the auxiliary function, whereby since the table format data of the auxiliary function is longer than an actual operating time, there is a problem that a cycle time is increased. When operation is performed by a path table with a path table number 1000 shown in FIGS. 14A to 14C, as shown in FIG. 15, a time obtained by adding a surplus time to the maximum operating time of an auxiliary function M1234 in which operating time is indefinite and which is instructed at L2.0 is L2.0 to L7.0, and therefore, even if M1234 is completed at L5.0, the next auxiliary function, M2345, cannot be output up to L8.0. For example in FIG. 15, the maximum operating time of M1234 plus surplus time includes L2.0 to L7.0, even though M1234 is completed at L5.0 in the Path Table. The next auxiliary function can be output from this point.

In the method of 2), since the feed shaft and the spindle cannot be driven while counting of reference is stopped, machining and machining preparation cannot be performed during execution of the auxiliary function, and therefore, there is a problem that the cycle time is increased. When the operation using the path table with a path table number 2000 shown in FIGS. 16A to 16C is performed, counting of a reference time is stopped until completion of the auxiliary function M1234 which is instructed at L2.0 and in which the operating time is indefinite, and therefore, the operations of the feed shaft and the spindle are stopped in the meantime (see FIG. 17). For example in FIG. 17, time serving as reference is stopped until completion of M1234, and meanwhile, feed shaft and spindle are stopped. Time serving as reference is started after completion of M1234, and feed shaft and spindle are operable from the point on the table of FIG. 17 with reference time of 3.0.

SUMMARY OF THE INVENTION

Thus, an object of the present invention is to provide a numerical controller which can prevent extension of a cycle time by executing an auxiliary function in which an operating time is indefinite and has a function of operation based on table format data.

In order to achieve the above object, a numerical controller according to the present invention includes: a memory which stores table format data, in which time or a position of a spindle or feed shaft serving as a reference is arranged so as to correspond to a position of a spindle or feed shaft other than the spindle or feed shaft of which position serves as a reference or an output of an auxiliary function, for each of the spindle or feed shaft other than the spindle or feed shaft of which position serves as a reference or the auxiliary function; and a reference value counter which inputs the time or the position of the spindle or feed shaft serving as a reference, wherein, sequentially reading the position of the spindle or feed shaft other than the spindle or feed shaft of which position serves as a reference or the output of the auxiliary function in synchronization with the value of the reference value counter, the position of the spindle or feed shaft other than the spindle or feed shaft of which position serves as a reference or the output of the auxiliary function is controlled. And the reference value counter is provided for each spindle or feed shaft other than the spindle or feed shaft of which position serves as a reference or for each auxiliary function, and, each of the table format data is executed based on each value of the reference value counter.

The numerical controller may further comprise a reset unit which independently resets the reference value counter, and a stop/restart unit which independently stops and restarts the reference value counter.

The numerical controller may further comprise a reference value counter selection unit which arbitrarily selects the reference value counter for each spindle, each feed shaft, or each auxiliary function.

The table format data for each spindle, the table format data for each feed shaft, or the table format data for each auxiliary function may include a waiting code that waits for operation using another table format data.

The waiting code may include information which specifies the table format data to be waited.

The waiting code may designate the table format data of another path to be waited by the table format data of the path which includes the waiting code.

The waiting code may instruct waiting in a path including the waiting code.

According to the present invention, there can be provided a numerical controller which can prevent extension of a cycle time by executing an auxiliary function in which an operating time is indefinite and has a function of operation based on table format data. In other words, according to the present invention, while counting of the reference of the auxiliary function is stopped at the start of execution of the auxiliary function with the indefinite operating time and counting of the reference of the auxiliary function is restarted at the end of the execution of the auxiliary function, the spindle and the feed shaft can execute the table format data based on their own reference, and therefore, the cycle time can be reduced in comparison with the conventional operation based on the table format data.

BRIEF DESCRIPTION OF THE DRAWINGS

The aforementioned and other objects and features of the present invention will be apparent from the following description of embodiments with reference to the accompanying drawings, in which:

FIGS. 3A to 3C are views for explaining the table format data used for the operation based on the table format data, including waiting in a path in a single-path system, wherein a reference value is set based on time;

FIG. 4 is a view for explaining the result of operation of the table format data as shown in FIGS. 3A to 3C;

FIGS. 5A to 5C are views for explaining a path table used for the operation based on the table format data, including waiting between paths in the three-path system;

FIG. 6 is a view for explaining the result of operation of the table format data as shown in FIGS. 5A to 5C;

FIGS. 13A and 13B are views showing an example of the table format data in case where the operation based on the table format data is waited in two paths;

FIGS. 14A to 14C are views for explaining a path table used when the operation based on the table format data is performed by the conventional first method;

FIG. 15 is a view for explaining the result of operation of the table format data as shown in FIGS. 14A to 14C;

FIGS. 16A to 16C are views for explaining a path table used when the operation based on the table format data is performed by the conventional second method; and FIG. 17 is a view for explaining the result of operation of the table format data as shown in FIGS. 16A to 16C are operated.

DETAILED DESCRIPTION OF THE PREFERRED EMBODIMENTS

The present invention allows more flexible control by providing a unique reference for each table format data such as a spindle, a feed shaft, and an auxiliary function in an operation using a table format data, so that the cycle time can be reduced. In the present invention, there is provided means that stops counting of reference in the table format data of the auxiliary function, while an auxiliary function in which the operating time is indefinite is executed, but continuously performs counting of reference in the table format data of the feed shaft and the spindle. As a result, although it is considered that the reference is shifted for each table format data, there is provided means that waits for the operation of the table format data for each feed shaft, the operation of the table format data for each spindle, and the operation of the table format data for each auxiliary function, and therefore, one operation can be synchronized with another operation according to need.

Figure 1:
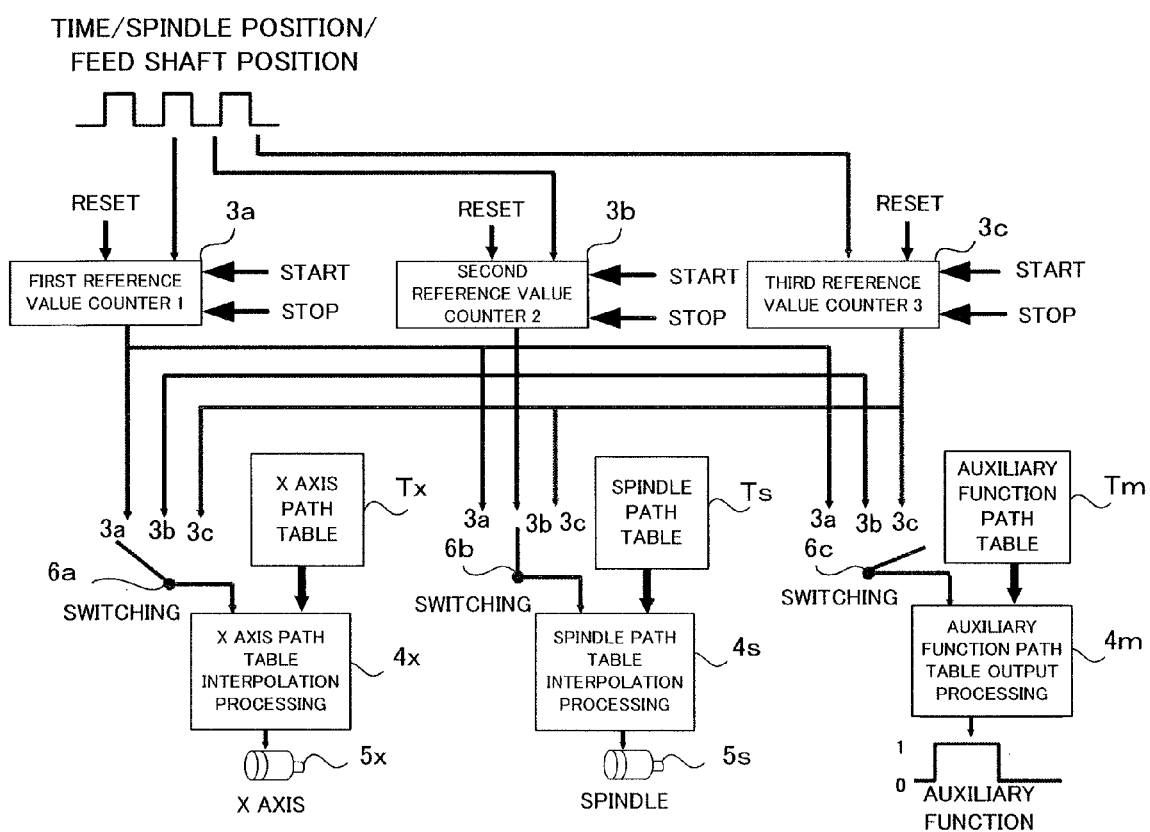
FIG. 1 is a view for explaining a general outline of a function of operation based on table format data of a numerical controller according to the present invention.

FIG. 1 is a view for explaining a general outline of a function of operation based on table format data of a numerical controller according to the present invention.

The numerical controller shown in FIG. 1 includes a first reference value counter 3a, a second reference value counter 3b, a third reference value counter 3c, an X-axis path table Tx, a spindle path table Ts, an auxiliary function path table Tm, an X-axis path table interpolation processing unit 4x, a spindle path table interpolation processing unit 4s, an auxiliary function path table output processing unit 4m, an X-axis motor 5x, and a spindle motor 5s.

The first reference value counter 3a, the second reference value counter 3b, and the third reference value counter 3c count a signal (time) from a clock function of the numerical controller or a position detection signal (spindle position or feed shaft position) from a position detector attached to each feed shaft and spindle. When the first reference value counter 3a, the second reference value counter 3b, and the third reference value counter 3c receive a counting reset signal, respectively, they return a count value to an initial value. When these counters receive a stop signal, respectively, they stop updating of a count value. When they receive a restart signal, respectively, they restart the updating of the count value.

In an embodiment of the numerical controller according to the present invention, there are provided change-over switches 6a, 6b and 6c for arbitrarily switching the reference values from the first reference value counter 3a, the second reference value counter 3b, and the third reference value counter 3c and selecting the reference values. For example, path table operations of the X-axis path table Tx, the spindle path table Ts, and the auxiliary function path table Tm may be carried out based on the reference values from the first reference value counter 3a, from the second reference value counter 3b, and from the third reference value counter 3c, respectively. Alternatively, by setting the change-over switches 6a, 6b and 6c, path table operations of all of the path tables Tx, Ts and Tm may be carried out based on the reference value from the first reference value counter 3a.

Figure 2:
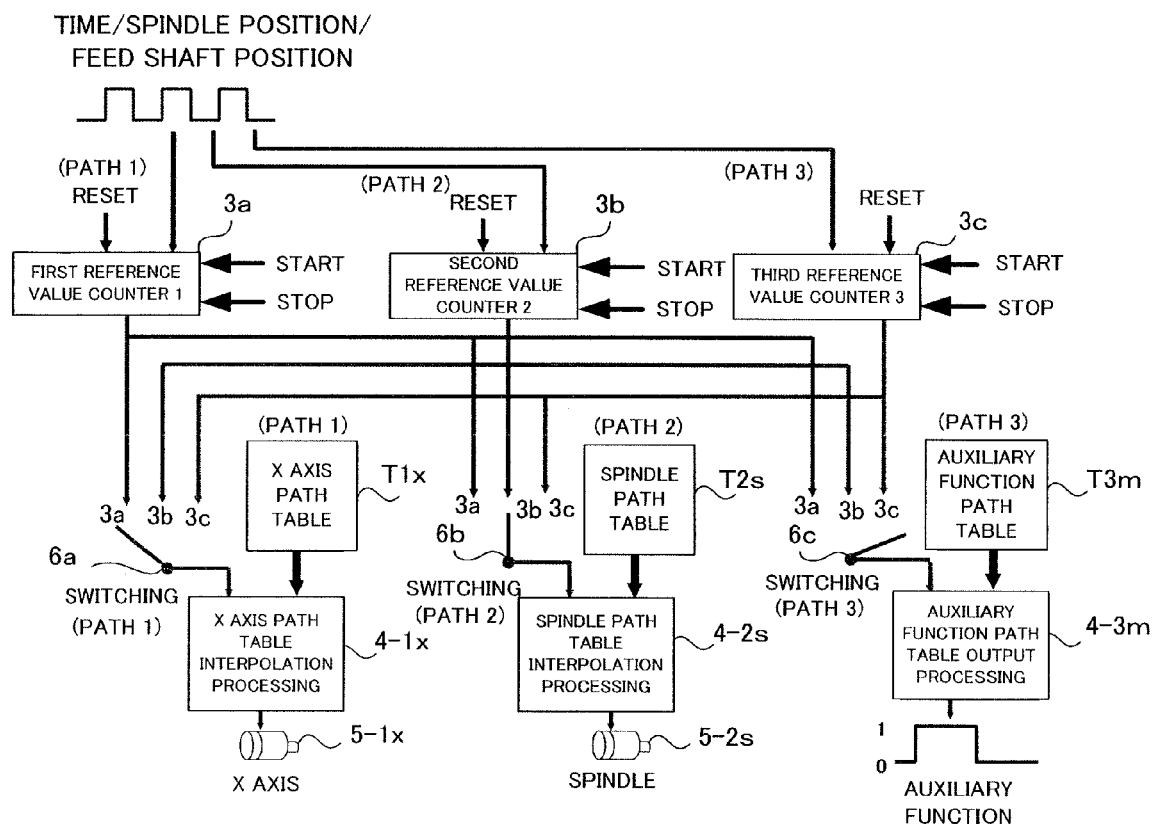
FIG. 2 is a block diagram explaining a general outline of operation based on the table format data in a three-path system.

FIG. 2 is a block diagram explaining a general outline of operation based on the table format data in a three-path system.

The numerical controller according to an embodiment of the present invention shown in FIG. 2 includes the first reference value counter 3a, the second reference value counter 3b, and the third reference value counter 3c, each of which independently counts time, a spindle position, or a feed shaft position, and further includes an X-axis path table T1x of a path 1, a spindle path table T2s of a path 2, an auxiliary function path table T3m of a path 3, an X-axis path table interpolation processing unit 4-1x of path 1, a spindle path table interpolation processing unit 4-2s of path 2, an auxiliary function path table output processing unit 4-3m of path 3, an X-axis motor 5-1x of path 1, and a spindle motor 5-2s.

The first reference value counter 3a, the second reference value counter 3b, and the third reference value counter 3c count a signal from the clock function of the numerical controller or the position detection signal from the position detector attached to each feed shaft and spindle. When the first reference value counter 3a, the second reference value counter 3b, and the third reference value counter 3c receive the counting reset signal, they return the count value to the initial value. When these counters receive the stop signal, they stop updating of the count value. When they receive the restart signal, they restart the updating of the count value.

The numerical controller according to an embodiment of the present invention includes the change-over switches 6a, 6b and 6c for arbitrarily switching the reference values from the first reference value counter 3a, the second reference value counter 3b and the third reference value counter 3c and selecting the reference values. For example, path table operations of the X-axis path table Tx, the spindle path table Ts and the auxiliary function path table Tm can be carried out based on the reference values from the first reference value counter 3a, the reference value from the second reference value counter 3b, and the reference valued from the third reference value counter 3c, respectively. Alternatively, by setting the change-over switches 6a, 6b and 6c, path table operations of all of the path tables Tx, Ts and Tm can be carried out based on the reference value from the first reference value counter 3a.

Embodiments of Waiting in Path

FIGS. 3A to 3C are views for explaining the table format data used for the operation based on the table format data, including waiting in a path in a single-path system. In this case, a reference value is set based on time. As shown in FIGS. 3A to 3C, each table format data has a time serving as a unique reference.

The auxiliary function outputs an auxiliary function M1234 in which operating time is indefinite at L2.0 and then stops counting time serving as a reference. Since the times serving as references for the X axis and the spindle S are each independent of the time serving as a reference for the auxiliary function, the X axis and the spindle S are operable, free of influence of the stoppage of the time serving as a reference for the auxiliary function.

After completion of the auxiliary function M1234 with the indefinite operating time, a waiting command WAIT (X, S, M) is instructed according to need, whereby the operation can be synchronized among the X axis, the spindle S, and the auxiliary function. After completion of waiting, the times serving as references for the X axis and the spindle S are started from L5.0, and, at the same time, the time serving as a reference for the auxiliary function is started from L3.0.

FIG. 4 is a view for explaining the result of operation of the table format data as shown in FIGS. 3A to 3C.

When synchronization of operation is required, waiting is performed. When the path tables of the X axis (feed shaft), the spindle S and the auxiliary function are operated, the X axis and the spindle S wait for the auxiliary function according to the waiting command (WAIT (X, S, M)) at L5.0, and the operation is synchronized among the X axis, the spindle S and the auxiliary function. In the waiting command (WAIT (X, S, M)), waiting among the X axis, the spindle S and the auxiliary function in a path is designated. The time serving as a reference, used in the operation of the path table Tm of the auxiliary function, is stopped until the completion of M1234. Although time (ms) serving as reference is stopped for only auxiliary function until completion of M1234, feed shaft and spindle are operable meanwhile. Meanwhile, counting of the time serving as a reference, used in the operation of the path table Tx of the X axis and the path table Ts of the spindle S is continued, as a result, the X axis and the spindle S are operable.

Embodiment of Waiting between Paths

FIGS. 5A to 5C are views for explaining a path table used for the operation based on the table format data, including waiting between paths in the three-path system. In this case, a reference value is set based on time. As shown in FIGS. 5A to 5C, each table format data has a time serving as a unique reference.

In the path table operation in paths 1 to 3, waiting commands (WAIT (P1X, P2S, P3M)) are instructed at L5.0 of the path table T1x of the X axis of path 1 and at L5.0 of the path table T2s of the spindle S of path 2, and waiting commands (WAIT (P1X,P2S,P3M)) are instructed at L3.0 of the path table T3m of path 3. The waiting command (WAIT (P1X, P2S, P3M)) designates which of the table format data of which of the paths is waited. In the waiting commands WAIT (P1X, P2S, P3M), waiting among the path table of the X axis of path 1, the path table of the spindle S of path 2, and the path table of the auxiliary function of path 3 is designated. In this embodiment, although the three-paths are described, this also applies to two paths, four paths, or more number of paths, and it is within the scope of the present invention to have a unique reference value (in this case, a time serving as a reference) for each table format data.

FIG. 6 is a view for explaining the result of operation of the table format data as shown in FIGS. 5A to 5C.

The auxiliary function of path 3 outputs the auxiliary function M1234 in which operating time is indefinite at L2.0 and then stops counting of the time serving as a reference. Although time serving as reference is stopped only for auxiliary function until completion of M1234, spindle and shaft are operable meanwhile. Since the time serving as a reference for the X axis in path 1 and the time serving as a reference for the spindle S in path 2 are each independent of the time serving as a reference for the auxiliary function, the X axis and the spindle S are operable, free of influence of the stoppage of the time serving as a reference for the auxiliary function.

When synchronization of operation is required, waiting is performed. After completion of the auxiliary function M1234 in which operating time is indefinite, the waiting command WAIT (P1X, P2S, P3M) is instructed according to need, whereby the operation can be synchronized among the X axis, the spindle S and the auxiliary function. After completion of waiting, the times serving as references for the X axis and the spindle S are started from L5.0, and, at the same time, the time serving as a reference for the auxiliary function is started from L3.0.

Figure 7:
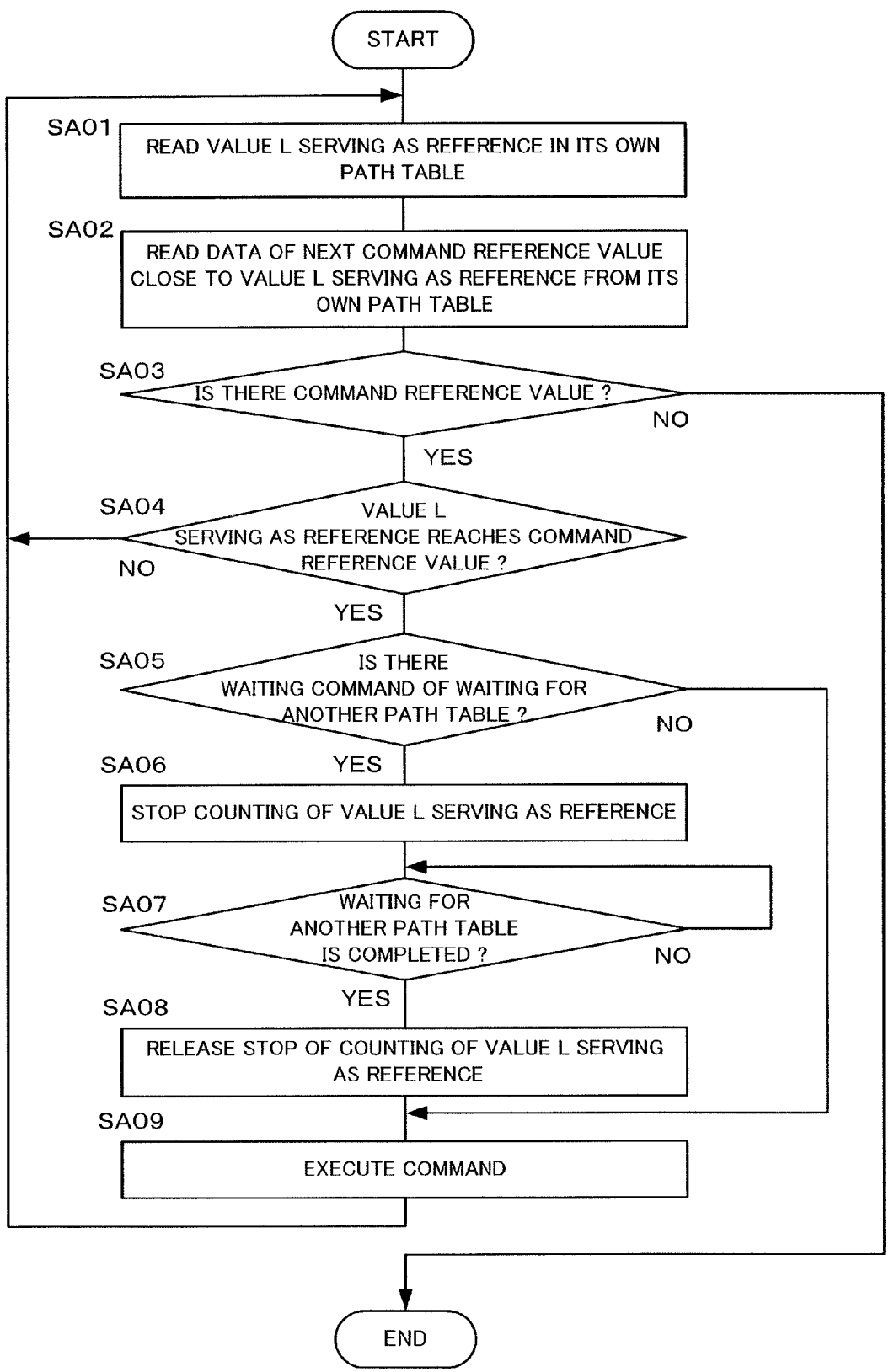
FIG. 7 is a flow chart showing a processing of the operation based on the table format data of an auxiliary function of the numerical controller according to the present invention.

FIG. 7 is a flow chart showing a processing of the operation using a table format data of the auxiliary function of the numerical controller according to the present invention. The flow chart describes processing in waiting in its own path and waiting in other paths. It is to be noted here that the table format data of the auxiliary function used in the operation processing is a path table. The processing will be described for respective steps as follows.

[Step SA01] A value L serving as a reference in its own path table is read

[Step SA02] Data of a next command reference value close to the value L serving as a reference read in step SA01 is read from its own path table.

[Step SA03] It is determined whether or not there is the command reference value read in step SA02 in its own path table, and when there is the command reference value, the process proceeds to step SA04, and there is no command reference value, the process is terminated.

[Step SA04] It is determined whether or not the value L serving as a reference reaches the command reference value in its own path table, and when the value L serving as a reference reaches the command reference value, the process proceeds to step SA05. When the value L serving as a reference does not reach the command reference value, the process returns to step SA01, and the processing is continued.

[Step SA05] It is determined whether or not there is any waiting command of waiting for other path tables, and when there is a waiting command, the process proceeds to step SA06, and when there is no waiting command, the process proceeds to step SA09.

[Step SA06] Counting of the value L serving as a reference is stopped.

[Step SA07] It is determined whether or not waiting for the other path tables is completed, and when waiting is completed, the process proceeds to step SA08. When waiting is not completed, completion of waiting is waited.

[Step SA08] Stopping of counting of the value L serving as a reference is released.

[Step SA09] The command (of the auxiliary function) is executed, and the process is returned to step SA01 to continue the processing.

Figure 8:
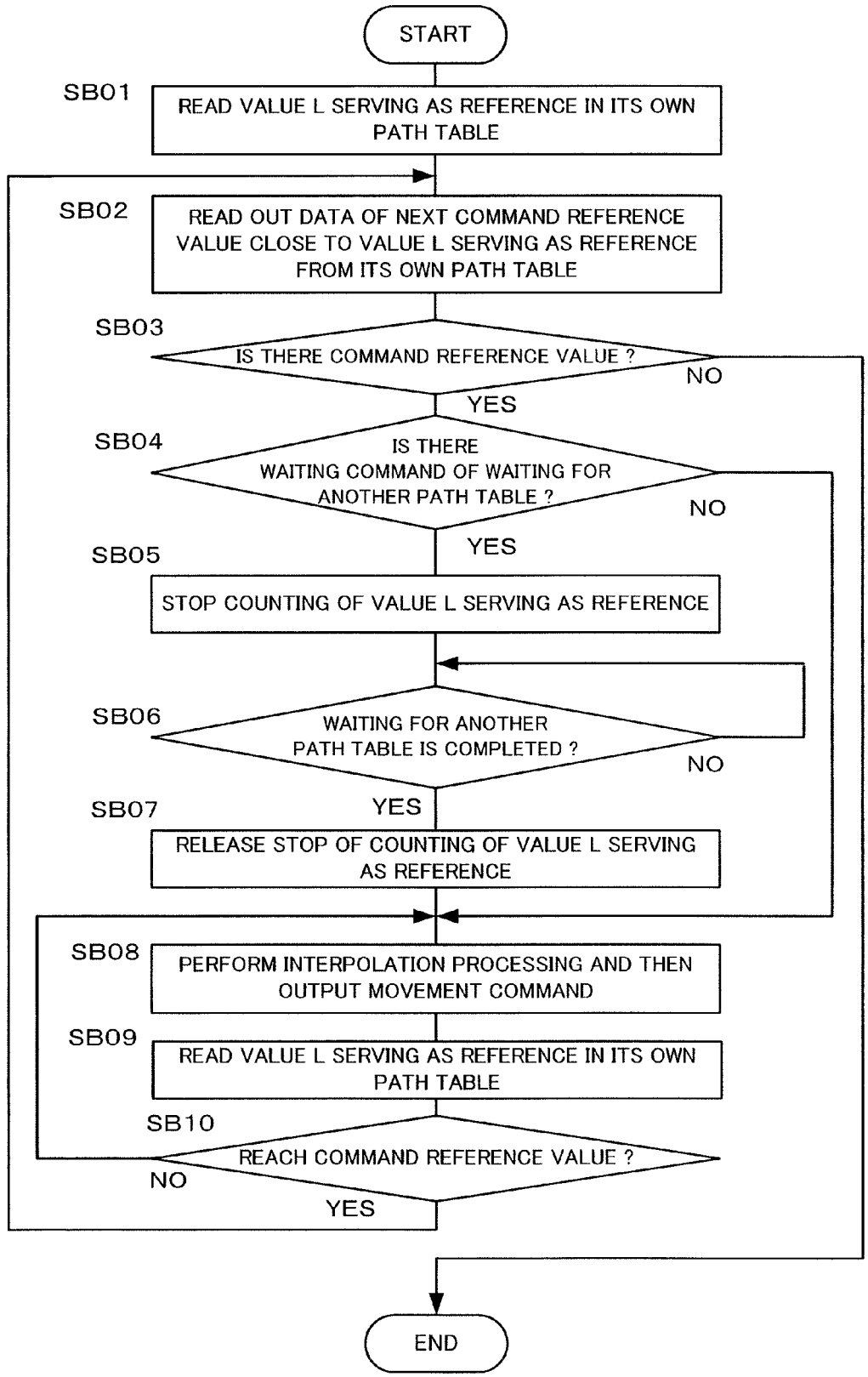
FIG. 8 is a flow chart of operation processing using the table format data of a spindle or a feed shaft which the numerical controller according to the present invention has.

FIG. 8 is a flow chart of operation processing using the table format data of a spindle or a feed shaft of the numerical controller according to the present invention. The flow chart describes processing of waiting in its own path and waiting in other paths.

[Step SB01] The value L serving as a reference in its own path table is read.

[Step SB02] Data of a next command reference value close to the value L serving as a reference, read in step SB01, is read from its own path table.

[Step SB03] It is determined whether or not there is any command reference value read in step SB02 in its own path table, and when there is the command reference value, the process proceeds to step SB04, and there is no command reference value, the processing is terminated.

[Step SB04] It is determined whether or not there is the waiting command of waiting for other path tables, and when there is a waiting command, the process proceeds to step SB05, and when there is no waiting command, the process proceeds to step SB08.

[Step SB05] Counting of the value L serving as a reference is stopped.

[Step SB06] It is determined whether or not waiting for the other path tables is completed, and when waiting is completed, the process proceeds to step SB07. When waiting is not completed, completion of waiting is waited.

[Step SB07] Stopping of counting of the value L serving as a reference is released.

[Step SB08] The interpolation processing is performed, and a movement command is output.

[Step SB09] The value L serving as a reference in its own path table is read.

[Step SB10] It is determined whether or not the value L serving as a reference, read in step SB09, reaches the command reference value read in step SB02, and when the reference value L does not reach the command reference value, the process returns to step SB08, and the processing is continued. When the reference value L reaches the command reference value, the process returns to step SB02, and the processing is continued.

Figure 9:
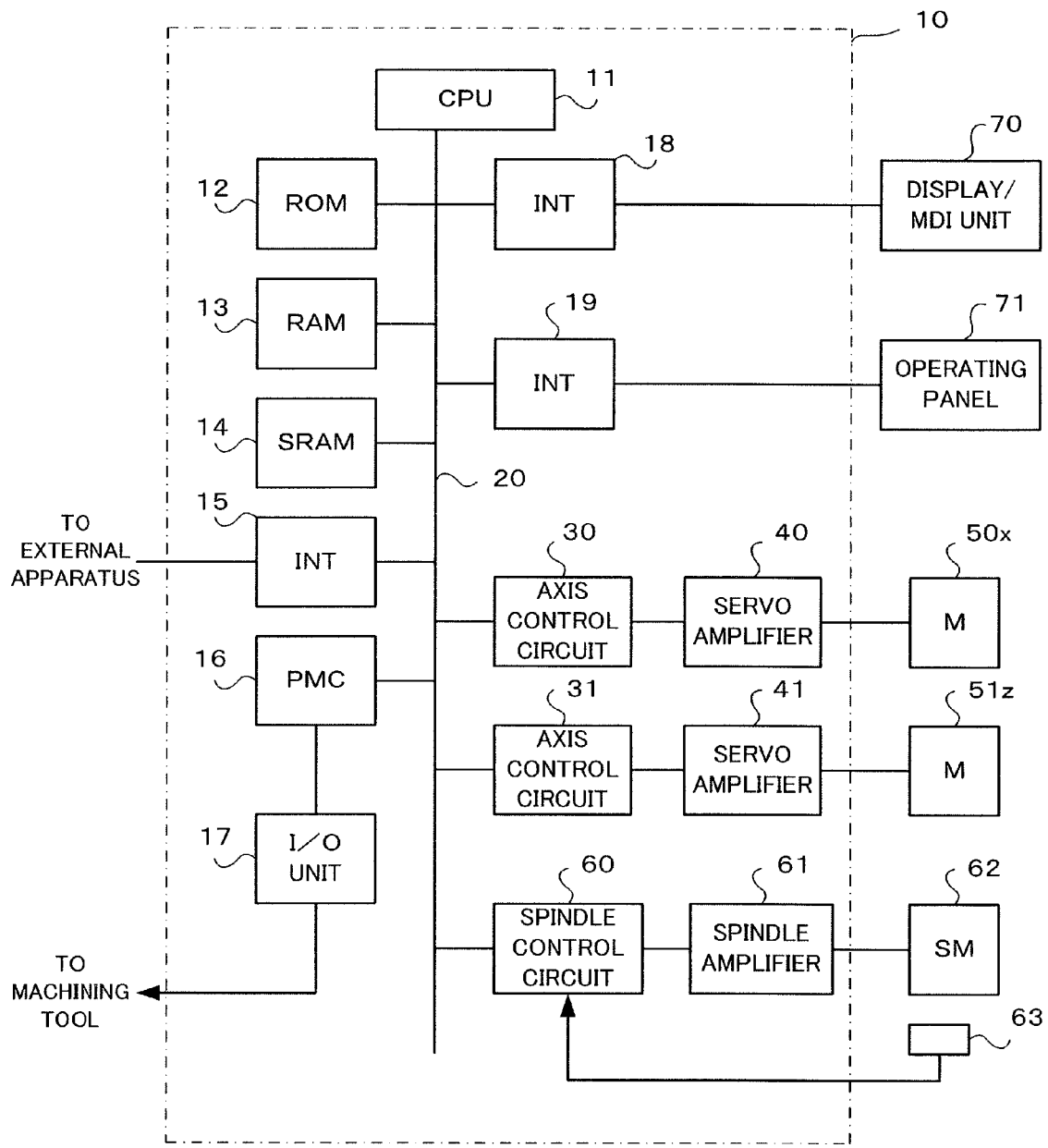
FIG. 9 is a block diagram of a relevant unit of the numerical controller having a function of performing operation based on the table format data (path table), according to the present invention.
Figure 10:
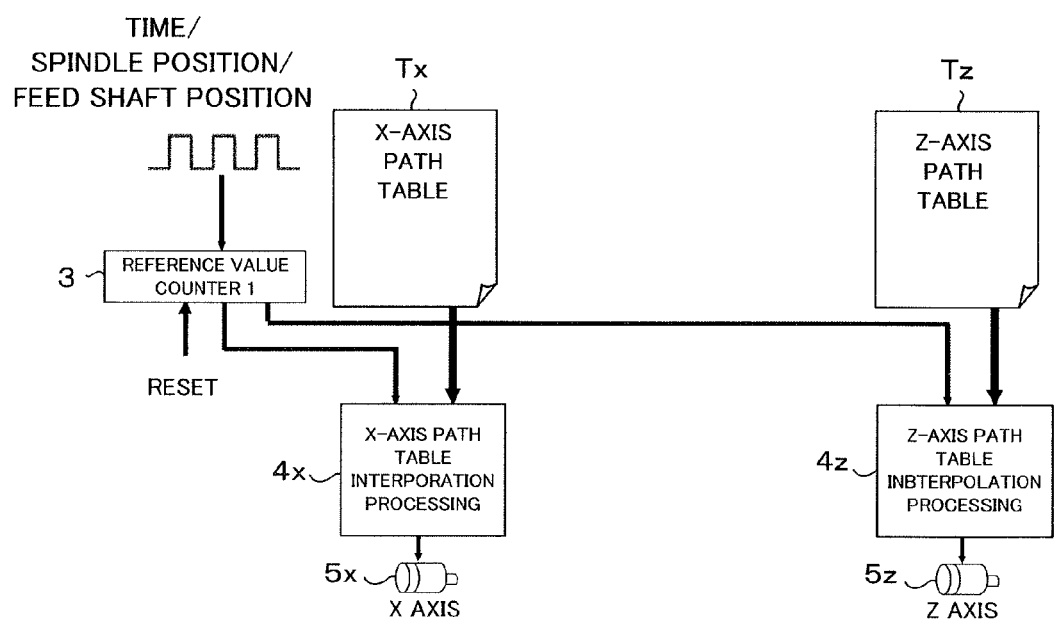
FIG. 10 is a block diagram explaining a general outline of the operation based on the table format data (path table) disclosed in Japanese Patent Application Laid-Open No. 2003-303005.
Figures 11A, 11B:
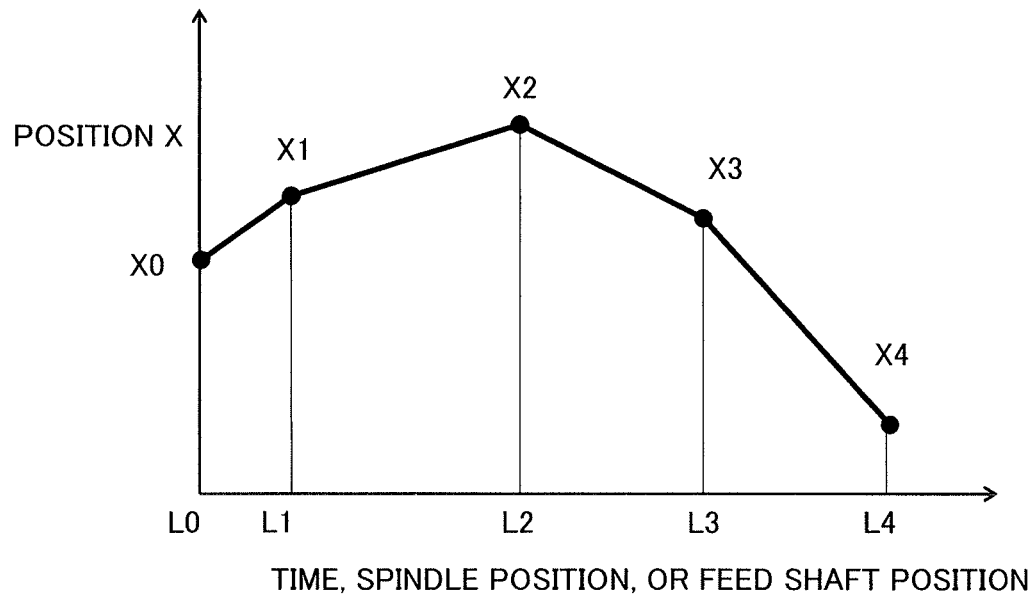
FIGS. 11A and 11B are views showing an example of the table format data.
Figure 12:
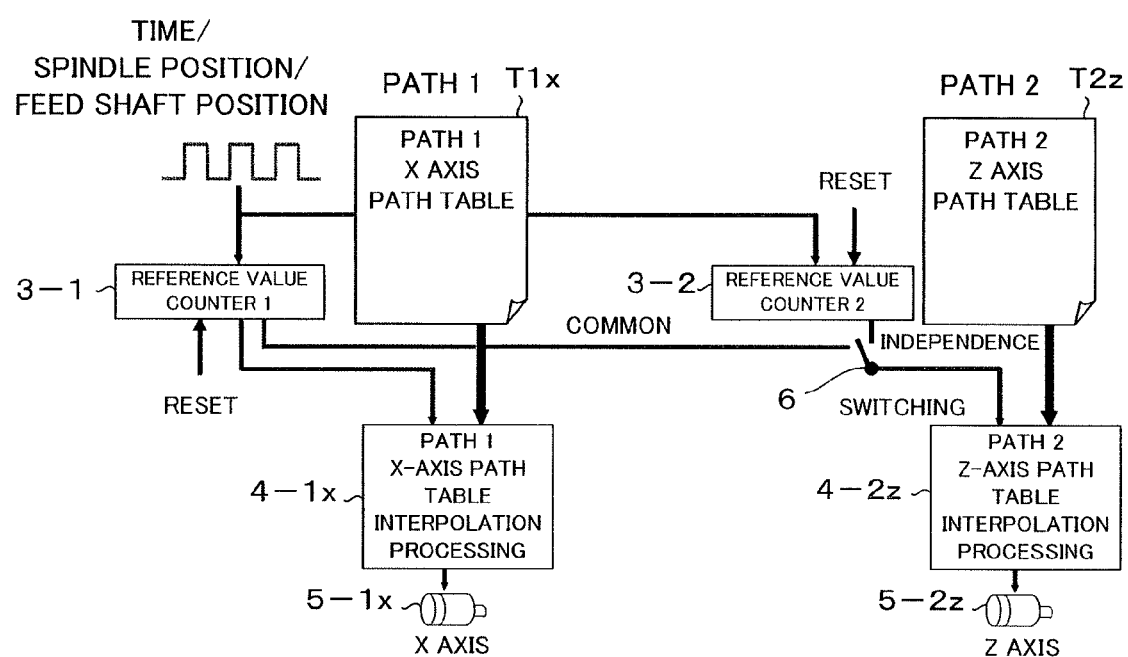
FIG. 12 is a block diagram explaining a general outline of the operation based on the table format data (path table) disclosed in Japanese Patent Application Laid-Open No. 2006-302208.

FIG. 9 is a block diagram of a relevant unit of the numerical controller having a function of performing operation based on the table format data (path table) according to the present inveniton.

A CPU 11 is a processor which controls the entire numerical controller 10, reads out a system program stored in a ROM 12 through a bus 20, and controls the entire numerical controller 10 according to the read system program. The RAM 13 stores temporary calculated data and displayed data and various data input by an operator through a display/MDI (manual data input) unit 70. The SRAM 14 is backed up by a battery (not shown) and is configured as a non-volatile memory in which memory is held even if a power source of the numerical controller 10 is turned off. The SRAM 14 stores a machining program read through an interface 15 and a machining program and so on input through the display/MDI unit 70. Further, each of the above table format data is previously stored in the SRAM 14. In the ROM 12, various system programs for performing creation of the machining programs and editing process are previously loaded.

The interface 15 allows connection between the numerical controller 10 and an external apparatus (not shown) such as an adapter. The machining program edited in the numerical controller 10 can be stored in an external storage device through an external apparatus. When a PMC (programmable machine controller) 16 performs control, the PMC 16 outputs a signal to an auxiliary device such as an actuator of a machining tool through an I/O unit 17 according to a sequence program loaded in the numerical controller 10. Further, the PMC 16 receives a signal from various switches and so on of an operating panel of a main body of a machining tool, performs necessary signal processing, and then delivers the signal to the CPU 11.

The display/MDI unit 70 is a manual data input device including a display, a keyboard and so on, and the interface 18 receives commands and data from the keyboard of the display/MDI unit 70 and delivers them to the CPU 11. An interface 19 is connected to an operating panel 71 and receives various commands from the operating panel 71.

Axis control circuits 30 and 31 of each feed shaft receive movement commands for the respective feed shafts from the CPU 11 and output the commands for the respective feed shafts to servo amplifiers 40 and 41. Those serve amplifiers 40 and 41 receive commands for the respective feed shafts and drive serve motors 50x and 51z corresponding to each feed shaft. The servo motors 50x and 51z of each feed shaft include position/speed detector (not shown). The servo motors 50x and 51 z feed back a position/speed feed back signal from the position/speed detector to the axis control circuits 30 and 31 and perform feed back control of a position and speed. In FIG. 9, the feed back of a position and speed is not described.

A spindle control circuit 60 receives a spindle rotation command and outputs a spindle speed signal to a spindle amplifier 61. The spindle amplifier 61 receives the spindle speed signal and rotates a spindle motor 62 at an instructed rotation speed. A position detector 63 feeds back a feed-back pulse (reference pulse) and a one-rotation signal to the spindle control circuit 60 in synchronism with the rotation of the spindle motor 62. The feed-back pulse and the one-rotation signal are used for speed control.

The feed-back pulse (reference pulse) and the one-rotation signal are read by the CPU 11 through the spindle control circuit 60, and the feed-back pulse (reference pulse) is counted by a counter (corresponding to each reference value counter of FIGS. 1, 2, 10, and 12) provided in the RAM 13. An instruction pulse of the spindle may be counted. The counter provided in the RAM 13 counts a pulse number of a temporal signal obtained from a clock function of the numerical controller 10 or the pulse number obtained from the feed back signal from the feed shaft and obtains a reference signal (corresponding to "value L serving as a reference" of FIGS. 7 and 8) in the path table operation. The instruction pulse of the feed shaft may be counted.

The numerical controller 10 may be constituted as either a single-path or a plurality of paths.

The invention claimed is:

1. A numerical controller configured to operate based on table format data, the numerical controller comprising:
   a memory which stores table format data, in which time or a position of a spindle or feed shaft serving as a reference is arranged so as to correspond to a position of a spindle or feed shaft other than the spindle or feed shaft of which position serves as a reference and an output of an auxiliary function, for each of the spindle or feed shaft other than the spindle or feed shaft of which position serves as a reference and the auxiliary function; and
   a reference value counter which inputs the time or the position of the spindle or feed shaft serving as a reference,
   wherein, sequentially reading the position of the spindle or feed shaft other than the spindle or feed shaft of which position serves as a reference and the output of the auxiliary function in synchronization with the value of the reference value counter, the position of the spindle or feed shaft other than the spindle or feed shaft of which position serves as a reference and the output of the auxiliary function is controlled,
   the reference value counter is provided for each spindle or feed shaft other than the spindle or feed shaft of which position serves as a reference and for each auxiliary function,
   each of the table format data is executed based on each value of the reference value counter, and
   the table format data for each spindle, the table format data for each feed shaft, and the table format data for each auxiliary function includes a waiting code that waits for operation using another table format data, and after a waiting command is executed based on the waiting code, an operation among each spindle, each feed shaft, and the auxiliary function are synchronized.

2. The numerical controller having a function of operation based on table format data according to claim 1, further comprising:
   a reset unit which independently resets the reference value counter; and
   a stop/restart unit which independently stops and restarts the reference value counter.

3. The numerical controller having a function of operation based on table format data according to claim 1, further comprising a reference value counter selection unit which arbitrarily selects the reference value counter for each spindle, each feed shaft, and each auxiliary function.

4. The numerical controller having a function of operation based on table format data according to claim 1, wherein the waiting code includes information which specifies the table format data to be waited.

5. The numerical controller having a function of operation based on table format data according to claim 1, wherein the waiting code designates the table format data of another path to be waited by the table format data of the path which includes the waiting code.

6. The numerical controller having a function of operation based on table format data according to claim 1, wherein the waiting code instructs waiting in a path including the waiting code.

7. The numerical controller having a function of operation based on table format data according to claim 1, wherein the auxiliary function controls an operation of an external apparatus including an actuator using at least one of oil pressure and aft pressure.

8. The numerical controller having a function of operation based on table format data according to claim 1, wherein table format data of the auxiliary function is longer than an actual operating time of the auxiliary function, such that the output of the auxiliary function is not controlled at every time instance of controlling the position of the spindle or feed shaft other than the spindle or the feed shaft of which the position serves as the reference.

9. The numerical controller having a function of operation based on table format data according to claim 1, wherein after a waiting command is executed for the auxiliary function based on the waiting code, an operation among each spindle, each feed shaft, and the auxiliary function are synchronized.

\* \* \* \* \*